United States Patent [19]

Driscoll

[11] 3,934,316

[45] Jan. 27, 1976

[54] CLAMPING DEVICE

[76] Inventor: David M. Driscoll, 185 Devonshire St., Boston, Mass. 02110

[22] Filed: Aug. 5, 1974

[21] Appl. No.: 494,500

[52] U.S. Cl. ............. 24/243 CC; 24/263 A; 254/54

[51] Int. Cl.$^2$ .................... A44B 21/00; F16G 11/12

[58] Field of Search ...... 138/99; 24/243 CC, 243 R, 24/243 B, 243 D, 243 G, 68 T, 263 R, 263 HW, 263 LL, 263 LS, 263 A, 263 B, 263 C, 263 SB, 263 P; 254/13, 67, 54

[56] References Cited

UNITED STATES PATENTS

| | | | |
|---|---|---|---|
| 554,091 | 2/1896 | Sears | 24/243 B UX |
| 780,020 | 1/1905 | Brent | 24/243 B UX |
| 1,074,272 | 9/1913 | Kline | 24/243 B UX |
| 1,542,213 | 6/1925 | Brockett | 254/54 X |
| 2,311,042 | 2/1943 | Ferguson | 24/243 CC X |
| 2,604,352 | 7/1952 | Gonser | 24/243 B X |
| 3,033,559 | 5/1962 | Lindholm | 24/263 A X |

FOREIGN PATENTS OR APPLICATIONS

| | | | |
|---|---|---|---|
| 1,334,247 | 6/1963 | France | 24/263 A |
| 405,967 | 7/1966 | Switzerland | 24/263 A |

*Primary Examiner*—Donald A. Griffin
*Attorney, Agent, or Firm*—Wolf, Greenfield & Sacks

[57] ABSTRACT

The device comprises a preferably C-chaped member having clamping pieces at opposite ends. Each clamping piece has means for rotating the piece and opposite surfaces for engaging with a work piece. The device is functional as either a clamp or jack and in another embodiment the C-shaped member is formed in multiple sections which may be fixed in different relative positions.

3 Claims, 6 Drawing Figures

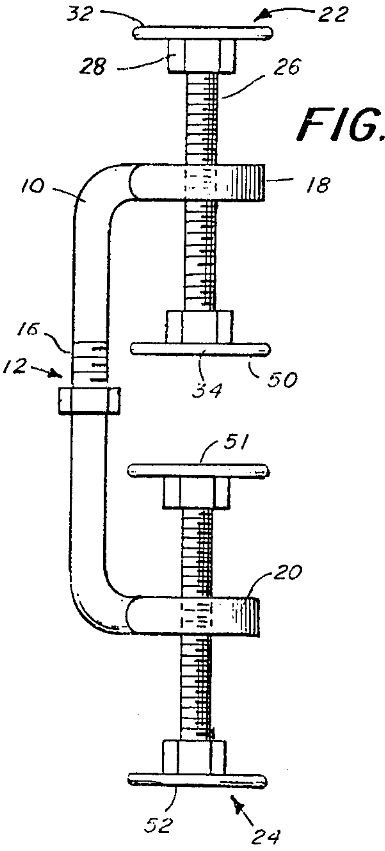
FIG. 1
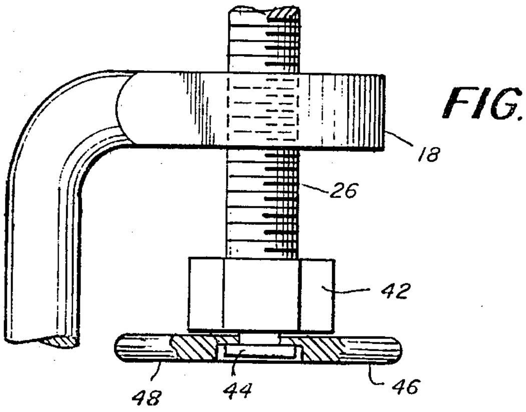
FIG. 2
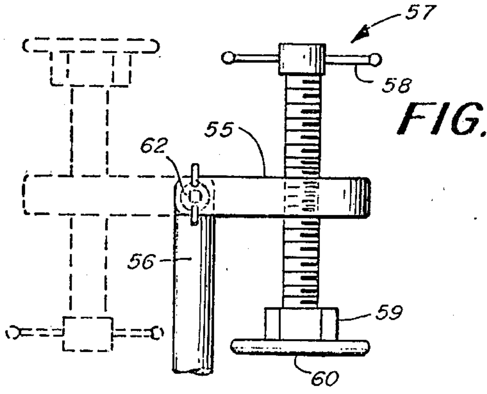
FIG. 3
FIG. 4
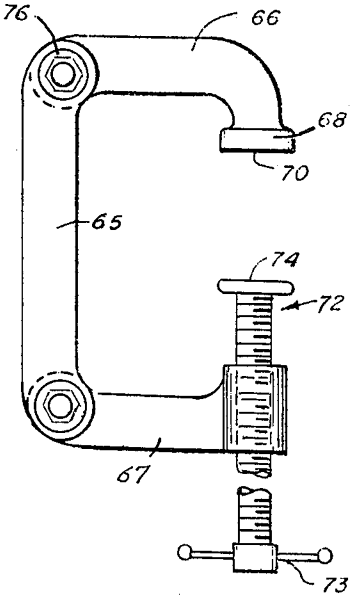
FIG. 5
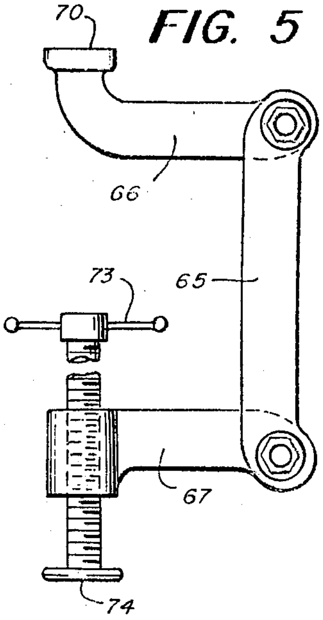
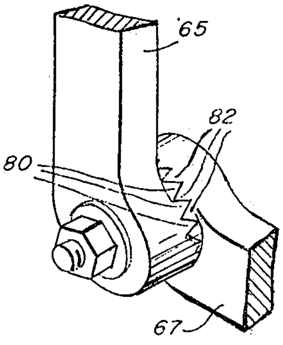
FIG. 6

CLAMPING DEVICE

BACKGROUND OF THE INVENTION

The present invention relates, in general, to a clamping device and is concerned, more particularly, with a device that can be used as a combination clamp or jack.

Conventional C-clamps are used extensively by craftsmen, mechanics, technicians and others. This relatively simple device is basically used to hold two pieces of material together. Other than the clamping function, this device serves no other useful purpose.

Accordingly, one object of the present invention is to provide a clamping device that functions as a clamp and that can also function as a jack.

Another object of the present invention is to provide a combination clamp and jack device that is relatively simple in construction and that is adjustable.

SUMMARY OF THE INVENTION

To accomplish the foregoing and other objects of this invention there is provided a combination clamp and jack apparatus which comprises a support member that is preferably C-shaped having opposite facing ends. A pair of clamping pieces, which may be of identical construction, are disposed at the opposite ends of the support member and are threadedly engagable with threaded apertures in the opposite ends of the support member. Although the clamping pieces may be of identical construction, they may also be of different construction wherein one of the clamping pieces is fixed in position relative to its respective end of the support member. Accordingly, at least one of the clamping pieces has means associated therewith for adjusting it relative to the other clamping piece. For providing the clamping function, the pieces have facing surfaces for clamping a work piece and for providing the jacking function, the pieces have opposite non-facing surfaces for jacking between two work pieces or work surfaces.

In another embodiment of the invention, preferably only one of the clamping pieces is adjustable. In this embodiment, the support member is constructed preferably in three pieces including a substantially straight center section and two facing end sections. The three pieces are interconnected by two securing members which are securing members which are secured so that the device functions as a clamp in one position. The end members of the support member can be rotated approximately 180° so that the device can then function as a jack.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 illustrates one view of a device of the present invention;

FIG. 2 is a fragmentary view showing a portion of the device of FIG. 1 with a slightly different embodiment for the clamping piece;

FIG. 3 is a fragmentary view of an alternate embodiment;

FIG. 4 shows still another embodiment of the present invention in a clamping position;

FIG. 5 shows the device of FIG. 4 in a jack position; and

FIG. 6 is a fragmentary view of a portion of the device shown in FIGS. 4 and 5.

DETAILED DESCRIPTION

The device shown in FIG. 1 comprises a support member 10 which is of generally C-shape. In the embodiment shown in FIG. 1 this member may be constructed in two pieces interconnected by an adjusting means 12 which comprises an adjusting nut 14. One of the pieces is threaded as shown at 16 to be received by the nut 14 and extend inside of the other piece so as to provide adjustment between the two ends 18 and 20 of the support member. The ends 18 and 20 respectively receive clamping pieces 22 and 24. In the embodiment shown in FIG. 1 each of these clamping pieces is of identical construction and thus only the piece 22 will be discussed in detail. This piece comprises a threaded shaft 26 having nuts 28 and 30 affixed to the ends thereof. The nuts 28 and 30 respectively support plates 32 and 34 which may be suitably supported so that the plates are rotatable relative to the nuts.

FIG. 2 shows a slightly different embodiment wherein the shaft 26 receives a bolt having a hexagonal heal 42. The shaft 26 may have a threaded aperture to receive the bolt. A flange 44 extends from the top of the head 42 and interlocks with member 46 which forms a flat surface 48. The member 46 is rotatable relative to the flange 44 which is fixed to the head 42.

Referring now to FIG. 1, the operation is such that for use as a clamp the surfaces 50 and 51 of pieces 22 and 24 can be tightened against a work piece (not shown). If the device shown in FIG. 1 is used as a jack, the surfaces 32 and 52 are positioned against a rest surface and the surface to be jacked. Either of the pieces 22 or 24 may be rotated such as at the nuts 28 or 30 to provide the jacking action. In FIG. 1 both of the pieces 22 and 24 are shown as being rotatable. However, one of these pieces could be fixed in position. Also, means other than the nuts 28 of FIG. 1 can be used for tightening the device.

FIG. 3 shows an alternate embodiment wherein the support member 10 is constructed in separate sections. Preferably there are three sections only two of which are shown in the fragmentary view of FIG. 3. These two sections include an end section 55 and a center section 56. There is, of course, another end section disposed at the other end of the device. In FIG. 3 one of the clamping pieces 57 is shown having a handle 58 at one end and a clamping member 59 at the other end with a flat surface 60.

In FIG. 3 the device is shown in its clamping position. In order to transfer the device to its jack position, there is provided a locking member 62 which can be disengaged. Thereafter the top section 55 is rotated to the position shown, in dotted, in FIG. 3 and the locking member 62 is then again secured. The same type of a locking arrangement is shown at the bottom of the device as indicated in FIG. 4 and to change to the jack position this bottom locking device would also be disengaged to permit the bottom section to rotate through 180°. The member 62 may be of the type shown in FIG. 6 but is illustrated in FIG. 3 as having a butterfly-type tighener rather than a hex-head.

FIG. 4 shows another embodiment of the present invention quite similar to that illustrated in FIG. 3. The shape of the device shown in FIG. 4 is quite similar to the standard C-clamp except that the clamp is separated into a center section 65 and end sections 66 and

67. The top section 66 teminates in a flange 68 having a flat surface 70. The bottom section 67 accommodates the clamping piece 72 which has a bottom handle 73 and a top flat surface 74. The pieces 65, 66 and 67 are connected by means of securing members 76 and 78. In FIG. 4 the clamp is shown in its clamping position with the members 76 and 78 secured in place. In FIG. 5, the device is shown in its jack position. In order to change between positions the members 76 and 78 are disengaged so that the sections 66 and 67 can be rotated approximately 180°. The members 76 and 78 are then again secured in the position shown in FIG. 5 where jacking can occur between surfaces 70 and 74.

FIG. 6 shows in detail an arrangement for one of the securing members coupling between sections 65 and 67. These two sections terminate in a flanged area defining serrations 80 and 82 which interlock in different positions. The hex nut maintains the serrations interlocked and the sections in fixed relative relationship.

What is claimed is:

1. A combination clamp and jack comprising;

a support member having a center section and two end sections, means for securing the center section and end sections to form a unitary support member wherein said end sections can assume different positions relative to the center section, said means for securing including a first securing member coupling one end of the center section with one end of one of said end sections to permit said one end section to rotate through at least 180° relative to said center section and where said first securing member includes means for fixedly securing the one end section in a clamp position and for fixedly securing the one end section in a jack position, and a second securing member coupling the other end of the center section with one end of the other end section to permit said other end section to rotate through at least 180° relative to said center section and wherein said second securing member includes means for fixedly securing the other end section in a clamp position and for fixedly securing the other end section in a jack position, the other end of said one end section defining an end surface for engagement with a work piece, a claimping piece received by the other end of the other end section and having a surface for engagement with a work piece, and means associated with the clamping piece for moving the clamping piece relative to the one end section of the support member, whereby said securing members maintain said end sections in a clamp position wherein the work piece engaging surfaces are facing each other, and maintains said end sections in a jack position wherein the work piece engaging surfaces are facing in opposite directions.

2. The combination of claim 1 whrein the securing means includes a nut and the sections have interlocking serrations.

3. The combination of claim 1 wherein said center section and end sections define a plane and said end sections are rotated within the plane to different positions.

* * * * *